(12) United States Patent
Lu

(10) Patent No.: US 11,108,572 B2
(45) Date of Patent: Aug. 31, 2021

(54) PHYSICALLY UNCLONABLE FUNCTION DEVICE WITH A LOAD CIRCUIT TO GENERATE BIAS TO SENSE AMPLIFIER

(71) Applicant: Taiwan Semiconductor Manufacturing Co., Ltd., Hsinchu (TW)

(72) Inventor: Shih-Lien Linus Lu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 191 days.

(21) Appl. No.: 16/158,252

(22) Filed: Oct. 11, 2018

(65) Prior Publication Data

US 2020/0119931 A1  Apr. 16, 2020

(51) Int. Cl.
| | |
|---|---|
| *H04L 9/32* | (2006.01) |
| *H04L 9/08* | (2006.01) |
| *G11C 11/4091* | (2006.01) |
| *G06F 7/76* | (2006.01) |
| *G11C 7/12* | (2006.01) |
| *H04L 9/14* | (2006.01) |

(52) U.S. Cl.
CPC ............ *H04L 9/3278* (2013.01); *G06F 7/764* (2013.01); *G11C 7/12* (2013.01); *G11C 11/4091* (2013.01); *H04L 2209/12* (2013.01)

(58) Field of Classification Search
CPC ..... G06F 7/764; H04L 9/3278; H04L 9/0866; H04L 2209/12
USPC .......................................................... 380/28
See application file for complete search history.

(56) References Cited

U.S. PATENT DOCUMENTS

| | | | |
|---|---|---|---|
| 8,130,955 B2* | 3/2012 | Trichina | G06F 7/588 331/78 |
| 2003/0056134 A1* | 3/2003 | Kanapathippillai | G06F 1/3237 713/324 |

(Continued)

OTHER PUBLICATIONS

Mafalda Cortez, et al., "Modeling SRAM Start-Up Behavior for Physical Unclonable Functions," IEEE International Symposium on Defect and Fault Tolerance in VLSI and Nanotechnology Systems, Oct. 2012, pp. 1-6.

*Primary Examiner* — Haresh N Patel
(74) *Attorney, Agent, or Firm* — JCIPRNET

(57) ABSTRACT

A physically unclonable function (PUF) device is provided. The PUF device includes: a plurality of PUF cells configured to generate an output. Each of the plurality of cells includes a sense amplifier, a load circuit. The sense amplifier includes a first circuit and a second circuit configured to generate a bit line and a complementary bit line. The sense amplifier having a first circuit and a second circuit configured to generate a bit line and a complementary bit line. The first circuit generates an output at a first output node and the second circuit generates an output at the second output node. The load circuit having a first transistor and a second transistor configured to generate a bias to the sense amplifier to obtain a mask bit at a first output node and a second output node. The control terminal of the first transistor is controlled by a first selection bit, and a control terminal of the second transistor is controlled by a second selection bit. The harvester circuit includes a first transistor and a second transistor receives the input from the load and generates the difference in the input.

20 Claims, 12 Drawing Sheets

(56) References Cited

U.S. PATENT DOCUMENTS

| | | | |
|---|---|---|---|
| 2005/0174859 A1* | 8/2005 | Mori | G11C 29/028 365/189.11 |
| 2008/0137388 A1* | 6/2008 | Krishnan | G11C 15/04 365/49.16 |
| 2011/0055307 A1* | 3/2011 | Hurd | G06F 7/49947 708/497 |
| 2011/0299678 A1* | 12/2011 | Deas | H04L 9/003 380/28 |
| 2012/0002803 A1* | 1/2012 | Adi | H04L 9/3278 380/28 |
| 2012/0044012 A1* | 2/2012 | Shibayama | G05F 3/30 327/437 |
| 2012/0224405 A1* | 9/2012 | Tanaka | G11C 5/06 365/72 |
| 2013/0094648 A1* | 4/2013 | Goettfert | H04L 9/28 380/28 |
| 2013/0243187 A1* | 9/2013 | Horstmeyer | H04L 9/0897 380/28 |
| 2013/0322617 A1* | 12/2013 | Orshansky | H04L 9/06 380/28 |
| 2014/0140502 A1* | 5/2014 | Brightsky | G06F 21/60 380/28 |
| 2015/0071430 A1* | 3/2015 | Zhu | G11C 11/1673 380/28 |
| 2015/0195085 A1* | 7/2015 | Kim | H04L 9/14 380/28 |
| 2015/0195088 A1* | 7/2015 | Rostami | H04L 9/3278 380/28 |
| 2015/0229482 A1* | 8/2015 | Pinkse | H04L 9/0852 380/28 |
| 2016/0093393 A1* | 3/2016 | Park | G11C 16/10 380/28 |
| 2016/0172037 A1* | 6/2016 | Lee | G11C 15/046 365/185.12 |
| 2017/0277457 A1* | 9/2017 | Lu | G06F 3/0673 |
| 2017/0365316 A1* | 12/2017 | Wang | G11C 11/1695 |
| 2018/0102908 A1* | 4/2018 | Narendra | H04L 9/0866 |
| 2018/0191512 A1* | 7/2018 | Tomishima | G06F 21/72 |
| 2019/0129455 A1* | 5/2019 | Yoshida | H01L 31/05 |
| 2019/0229933 A1* | 7/2019 | Li | G06F 3/06 |
| 2019/0326900 A1* | 10/2019 | Calabro | H03K 17/06 |

* cited by examiner

PHYSICALLY UNCLONABLE FUNCTION DEVICE WITH A LOAD CIRCUIT TO GENERATE BIAS TO SENSE AMPLIFIER

BACKGROUND

In the field of semiconductor manufacturing, even if there are two identical integrated circuits on the same die using the same manufacturing process and the same material, each integrated circuit would still be unique. This is due to the physical randomness introduced during the manufacturing steps. This inherent variation may be extracted and used as unique identifications and can be thought of as being similar to DNAs of human beings. Physically unclonable function have been proposed and have gained popularity recently as a cryptographic key generator. A PUF, based on its physical properties, may be evaluated easily and would produce an output, but such output could be hard to predict. This output may be used to provide a unique identity, since such variations are rarely the same. The unique identify cannot be easily to cloned as a direct copy of the same circuit when manufactured will produce a different signature (ID) from the original on being cloned. Many PUF circuits have been proposed. An important property of a PUF circuit is reliability. That is, a PUF circuit must be able to generate the same signature (ID) at all operating conditions and after it has been operated for a long time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
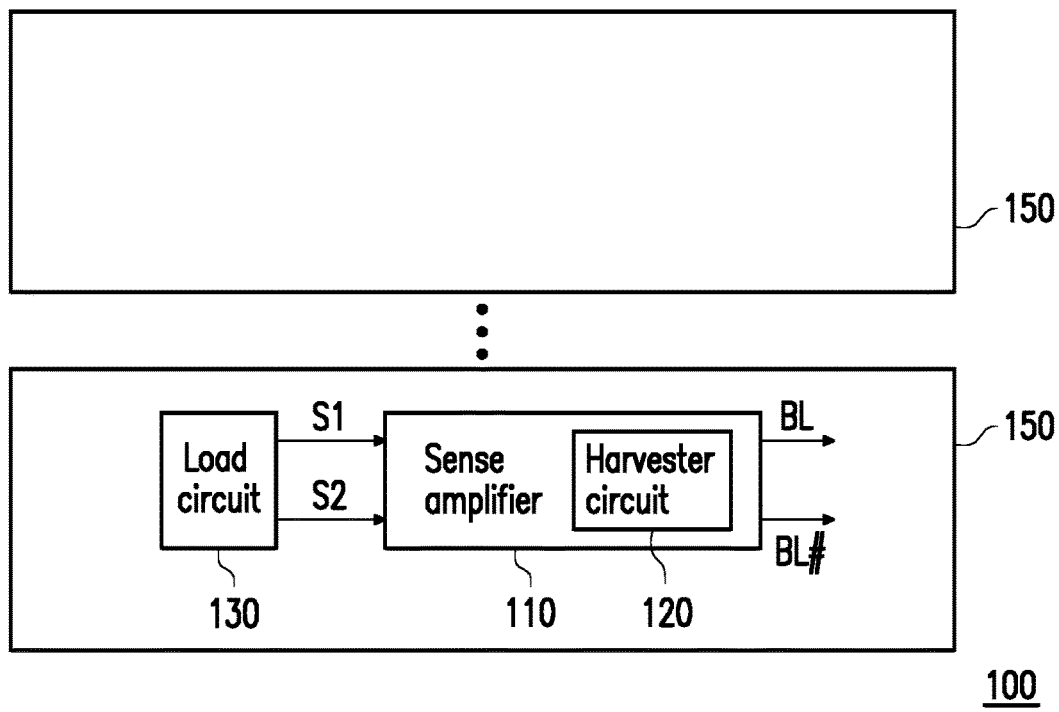
FIG. 1 illustrates a schematic block diagram of a physically unclonable function (PUF) device according to an exemplary embodiment of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A masking method may be employed to improve the reliability of PUF device as it operates under different operating conditions which may results in different signatures. Hence, we define a bit as stable when the bit stays in the same state under different operating conditions. A bit (generated by a PUF cell) is unstable, if the bit ends up in a different state under different conditions. Different operating conditions may be defined in terms of varying supply voltage or varying temperature for an example. The design masking method may identify a bit (from a PUF cell) to be unstable or stable during the masking phase. Once a mask is derived, the stable bit may be used in the actual generation of signature. After identification, the identified bits which are marked as stable may use as a final signature and bits which are marked as unstable are not used in a generation of signature. Identifying the unstable bits in the marking phase may achieved by adding all possible noises or stress to mimic the effect of the circuit behavior under different operating conditions in the PUF device. The mask stable bit is obtained by the PUF device which may tolerate the added noises under different operating conditions established during the marking phase. By adopting this method, an extra noise injection circuit may be needed however it is difficult and expensive to establish the different operating conditions during the marking phase. In addition, external power supply and external thermal condition system may be needed to establish the different operating conditions in the marking phase identify the stable and unstable bits to generate the PUF device with same signature ID.

In addition, because PUF devices are inherent as technologies continue to develop even though foundries have kept attempting to control the variations of the core devices, it could be desirable to actually develop a PUF device to obtain the mask stable bit during the marking phase without external power supplies and different operating condition for certain applications in this technical field.

FIG. 1 illustrates a schematic block diagram of a physically unclonable function (PUF) device according to an exemplary embodiment of the disclosure. Referring to FIG. 1, a PUF device 100 includes a plurality of PUF cells 150. Each of the plurality of PUF cells 150 includes a sense amplifier 110, and a load circuit 130. Each of the sense amplifier 110 includes a harvester circuit 120. The sense amplifier 110 receives a first selection bit S1 and a second selection bit S2 to generate a difference in the variation of the harvester circuit 120 coupled to the sense amplifier 110. The harvester circuit 120 evaluates the difference of the variation generated by the sense amplifier 110 and latches the output. The load circuit 130 generates a bias to the sense amplifier 110 to obtain a mask bit (stable "1" bit) in the PUF device. The sense amplifier 110 evaluates the difference of the variation generated by the harvester circuit 120 and latches the output.

Figure 2:
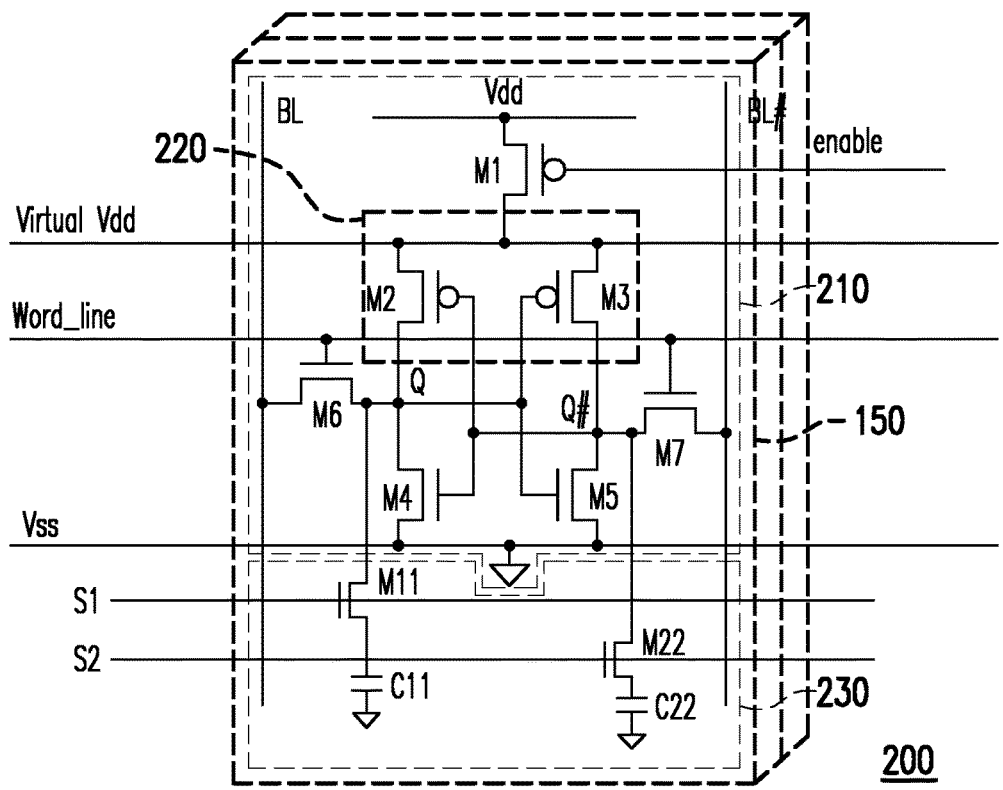
FIG. 2 illustrates a schematic diagram of a PUF device according to an exemplary embodiment of the disclosure.

FIG. 2 illustrates a detailed schematic diagram of a PUF device 200 having a plurality of PUF cells 150 same as FIG. 1, each of the plurality of PUF cells includes a sense amplifier 210 and a load circuit 230. The sense amplifier 210 includes a first circuit and a second circuit configured to generate a bit line BL and a complementary bit line BL#. The first circuit having a first pair of transistors M2 and M4 forms an inverter pair, generates an output at an internal node Q which is also defined as first output node of the sense amplifier 210. The transistors M2 and M3 serve as a harvester circuit 220 to evaluate the difference of the variation generated by the sense amplifier 210. The second circuit having a second pair of transistors M3 and M5 forms an inverter pair, generates an output at an internal node Q# which is also defined as second output node of the sense amplifier 210. The first circuit configured to generate the output BL through sixth transistor M6. Similarly, the second circuit configured to generate the output at the second output BL# through seventh transistor M7.

The first circuit and second circuit forms a cross coupled inverter. The first circuit and second circuit having CMOS transistors, transistors M2 and M3 is a PMOS coupled to the high side, first predetermined voltage Virtual_VDD and transistors M4 and M5 is a NMOS transistor coupled to the low side, ground voltage (VSS). The cross-coupled pair is enable through the power transistor M1. The first terminal and second terminal of the power transistor M1 is coupled to the second predetermined voltage VDD and first predetermined voltage Virtual_VDD. The control terminal of the power transistor receives enable signal to turn on the power transistor M1 to enable the cross-coupled pair. In one embodiment, when the power transistor M1 is PMOS, the PMOS transistors M2 and M3 in the sense amplifier 210 serve as a harvester circuit 220. In another embodiment, when the power transistor M1 is NMOS, the NMOS transistors M4 and M5 in the sense amplifier 210 serve as a harvester circuit 220. In some embodiments, the harvester circuit 220 is a separate block in the PUF cell, which is not serve as a part of sense amplifier 210. Hence the harvester circuit used in the disclosure is not limited thereto.

The input terminal of the first circuit receives input from second output node Q# and the input terminal of the second circuit receives input from the first output node Q. Both the first circuit and second circuit configured to generate the BL and BL# to sense amplifier through sixth transistor M6 and seventh transistor M7 respectively. The control terminal of the sixth transistor M6 and seventh transistor M7 are enabled by word_line signal to turn on the pass transistors to pass the output from the internal output nodes Q and Q# to BL and BL#. Since a sense amplifier is well-know, the detailed description of the sense amplifier to generate the latched output is omitted herein.

The load circuit 230 includes a first transistor M11, a second transistor M22, a first capacitor C11 and a second capacitor C22. The load circuit 230 generates a bias voltage Vbias to the sense amplifier 210 to obtain a mask bit (stable "1" bit) to the PUF device. The first terminal of first transistor M11 and second transistor M22 are coupled to the first output node Q and second output node Q# of the sense amplifier 210. The second terminal of the first transistor M11 and the second transistor M22 are coupled to the first terminals of the first capacitor C11 and second capacitor C22. The control terminal of the first transistor M11 and the second transistor M22 are coupled to receive the first selection bit signal S1 and the second selection bit signal S2 to turn on the first transistor M11 and second transistor M22. The control terminal of the first transistor M11 and the second transistor M22 of the load circuit 230 is selectively turned on by the S1 and S2. It is noted that, both transistors M11 and M22 in load circuit 230 is not turned on at the same time. The second terminals of first capacitor C11 and second capacitor C22 are coupled to the ground voltage VSS.

The sense amplifier 210 comprises a plurality of transistors configured to receive a first input signal line and a second input signal line for receiving a first input signal BL and a second input signal BL # from the sense amplifier 210. The sense amplifier eventually enabled to obtain the stable "1" and "0" or "0" or "1" for the BL and BL #. At once, the BL and BL # reaches the stable binary value (bit value="0" or "1"), the sense amplifier generates the latched output result.

Figure 3A:
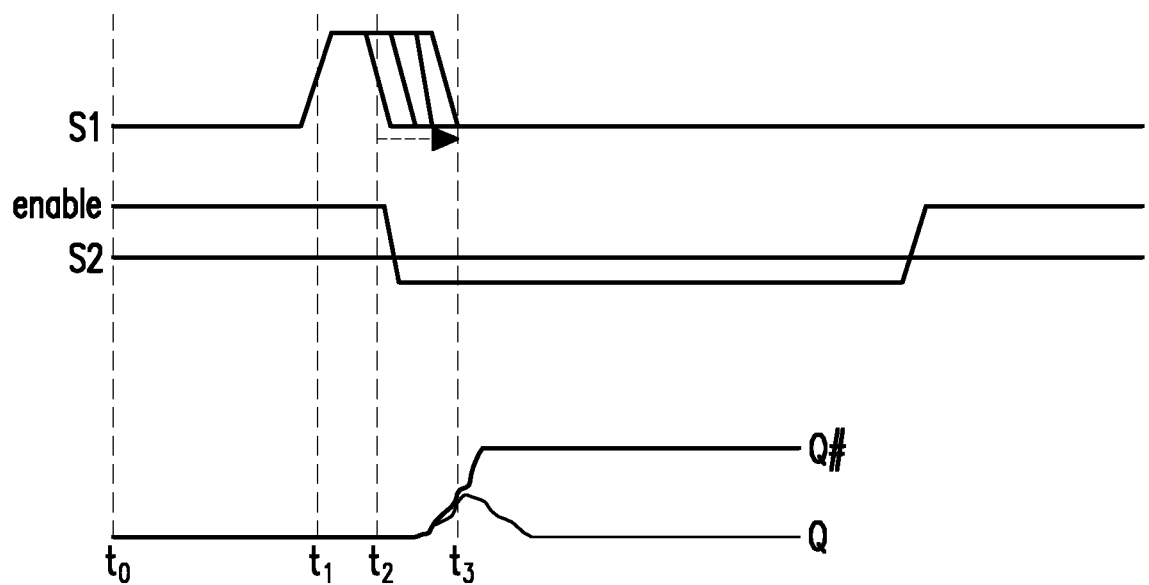
FIG. 3A-3D illustrates an operation waveform of a PUF device according to an exemplary embodiment of the disclosure.
Figure 3B:
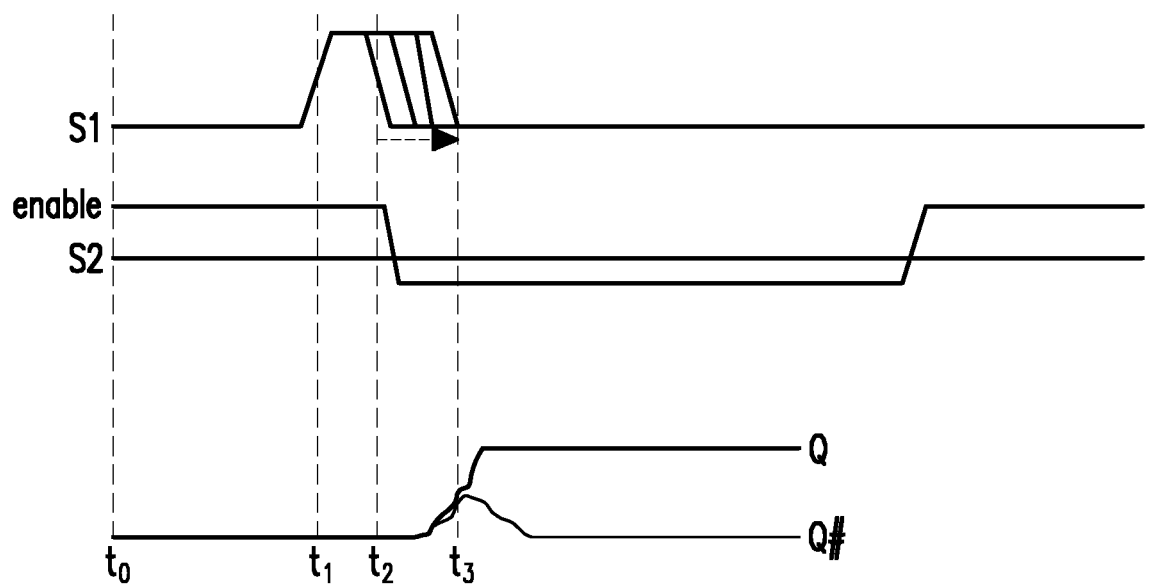
Figure 3C:
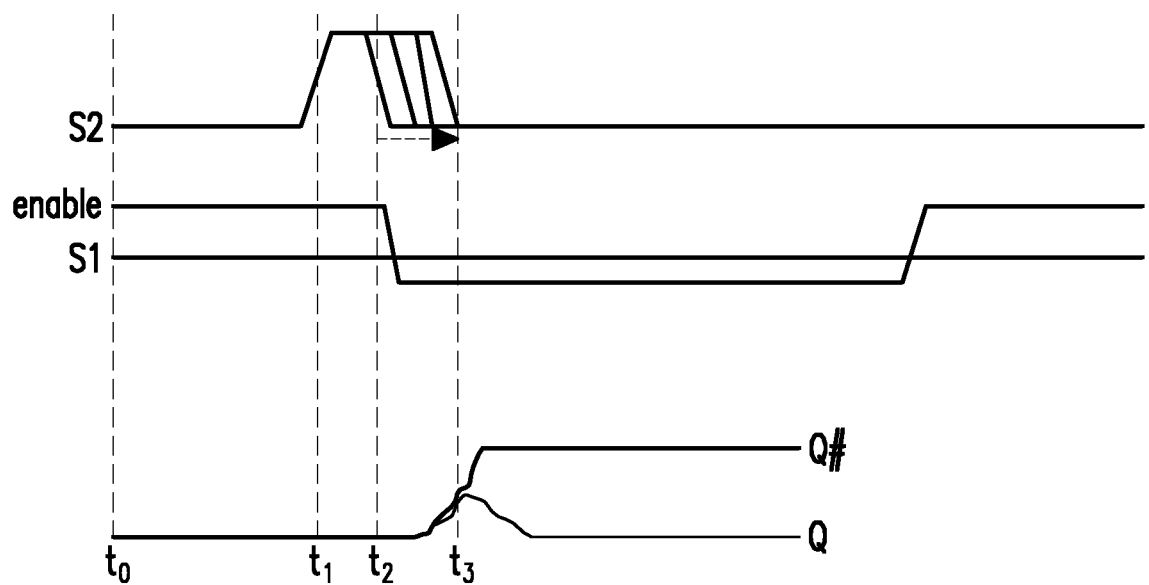
Figure 3D:
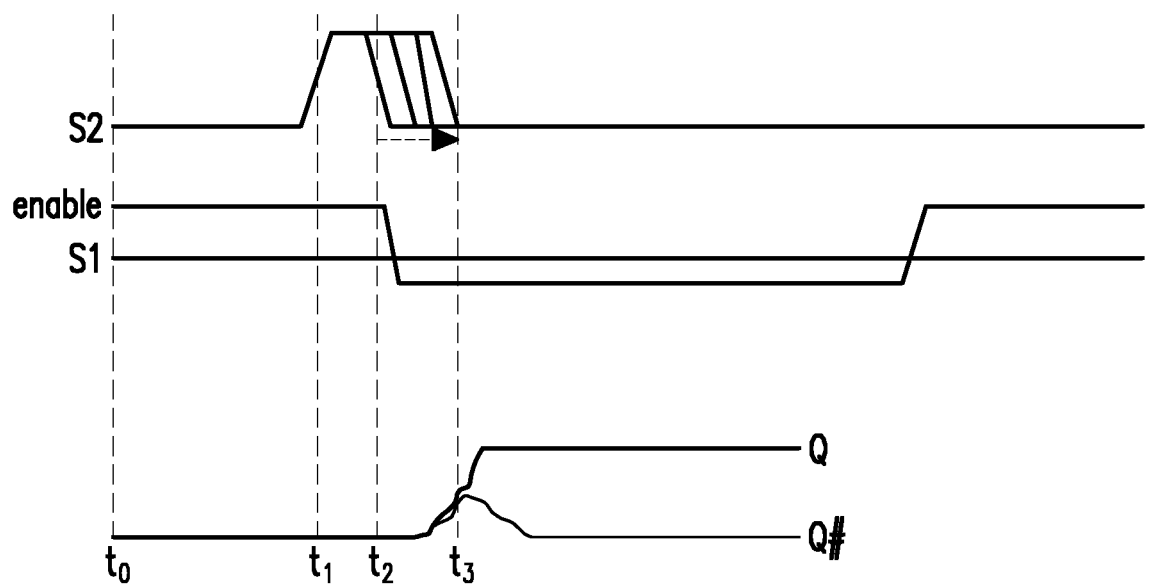

FIGS. 3A&3B illustrates an operation waveform of a PUF device according to another exemplary embodiment of the disclosure. As shown in FIG. 2, the first selection bit S1 and second selection bit S2 provided with logic low signal "0" bit to turn off both first transistor M11 and second transistor M22 in load circuit at time (t0) at the sense amplifier is tuned by enable the enable signal in the power transistor M1. The first circuit receives the bias voltage Vbias through the first transistor M11 by enable the first selection bit S1 with logic high "1" at the time (0). With reference to FIG. 3A in first case, during time (t2) when the transistor M2 is not enough to overcome the load provided from M11 and C11, the second output node Q # may rise faster and turn off the transistor M2 in the inverter causing the first output node pull down to VSS. In other words, current driving capability of M2 is less than M3 by adding an extra load into M2. In contrast, during the time period t2-t3, when the transistor M2 is strong enough to overcome the load provided from M11 and C11, the first output node Q may rise faster and turn off the transistor M3 in the inverter causing the second output node pull down to VSS. In detail, the current driving capability of M2 is higher than M3 even the extra load is added at M3. Thus, determining the strong transistor to overcome the extra load during the marking phase to obtain the masking bits. With reference to FIG. 3C-3D, during the second case, when switch S2 is turned on and S1 is turned off, the operation sequence is similar as first case as detailed above in FIG. 3A. In detail, when the load bias voltage Vbias is added to the first circuit in cross coupled pair there are two possibilities to determine the circuit is stable or unstable. When the first circuit is strong to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit. In some other embodiments the load circuit includes different parasitic elements (e.g., capacitor, resistor, inductor, etc.) to implement the load circuit. Hence the load circuit in this disclosure is not limited thereto.

After the load circuit is added to the first circuit, the internal output node Q of the inverter driving will take long time to raise the first output node as a result the second circuit PMOS transistor M3 will be rise fast to turn off the first circuit PMOS transistor M2 to avoid the first output node with load pull to ground voltage. Similarly, the load is added to the second circuit through the second transistor M22 by enable the second selection bit S2 with logic high "1". The operation sequence of adding load to first circuit is similar to second circuit, thus the detailed description of the second circuit operation waveform is omitted herein. It is noted that both the first transistor M11 and second transistor M22 are not enable (i.e., logic high "1") at the same time. Conversely, both transistors are pulled low or disable (i.e., logic low "0") before and after each marking phase to generate the mask bit (stable "1" bit) to generate signature of the PUF device.

Figure 4:
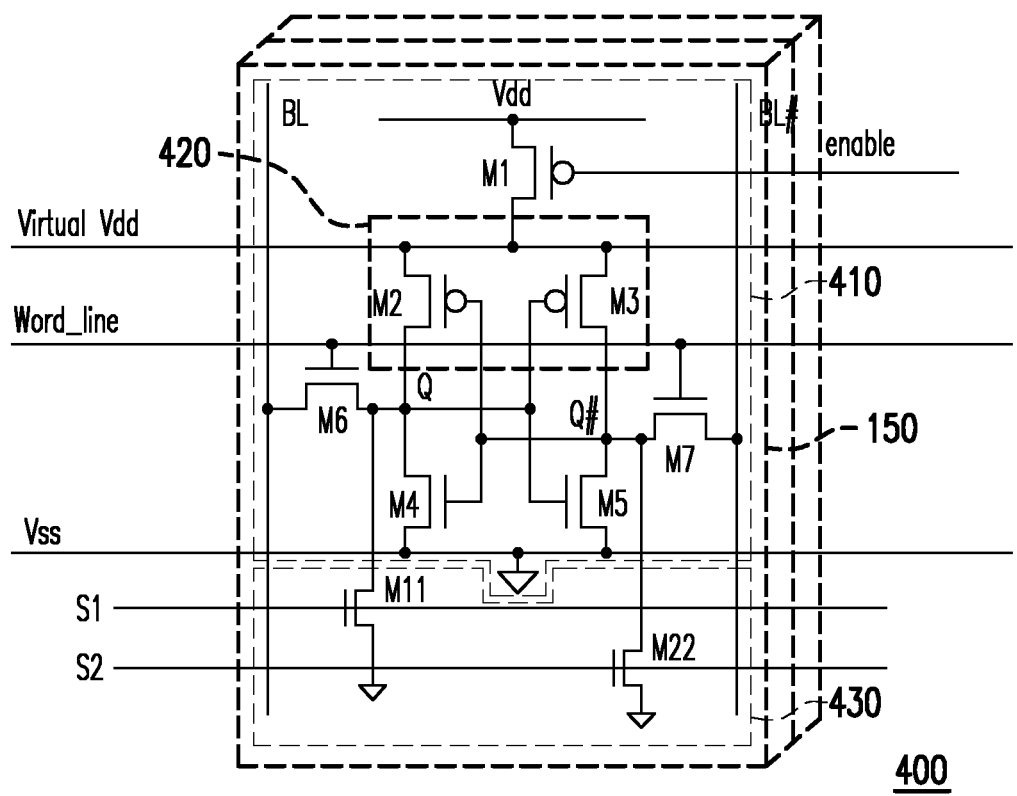
FIG. 4 illustrates a schematic diagram of a PUF device according to an exemplary embodiment of the disclosure.

FIG. 4 illustrates a detailed schematic diagram of a PUF device according to an exemplary embodiment of the disclosure. Referring to FIG. 4, having a plurality of PUF cells, each of the plurality of PUF cells includes a sense amplifier 410 and a load circuit 430, the sense amplifier 410 in the exemplary is similar with reference to FIG. 2, thus the detailed description of these circuits is omitted herein.

The load circuit 430 includes a first transistor M11, and a second transistor M22. The load circuit 430 configured to generate a bias voltage Vbias to the sense amplifier 410 to obtain a mask bit (stable "1" bit) to the PUF device. The first terminal of first transistor M11 and second transistor M22 are coupled to the first output node Q and second output node Q# of the sense amplifier 410. The second terminal of the first transistor M11 and the second transistor M22 are coupled to the ground voltage VSS. The control terminal of the first transistor M11 and the second transistor M22 are coupled to receive the first selection bit signal S1 and the second selection bit signal S2 to turn on the first transistor M11 and second transistor M22. The control terminal of the first transistor M11 and the second transistor M22 of the load circuit 430 selectively turned on by the S1 and S2. It is noted that, both transistors in load circuit 430 is not turned on at the same time.

Referring to FIG. 2, the exemplary embodiment of disclosure, the load circuit 430 is added to the sense amplifier 410 by adding a small current sink as a load to the first circuit or the second circuit to generate a mask bit. In some embodiments the load added to the sense amplifier 410 is smaller than the threshold voltage, Vth of the first transistor M11 and the second transistor M22, that is the transistor will operate in linear region to deliver a small current flow through the transistor to the sense amplifier 410, thereby adding bias to the sense amplifier 410.

With reference to FIG. 2 and FIGS. 3A & 3B, in the exemplary embodiment the first selection bit S1 and second selection bit S2 provided with logic low signal "0" bit to turn off both first transistor M11 and second transistor M22 in load at time (t0) at the sense amplifier is tuned by enable the enable signal in the power transistor M1. The first circuit receives the bias voltage Vbias through the first transistor M11 by enable the first selection bit S1 with logic high "1" at the time (t1). After the load bias voltage Vbias is added to the first circuit in cross coupled pair there are two possibilities to determine the circuit is stable or unstable. When the first circuit is strong to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit.

After the load circuit is added to the first circuit, the internal output node Q of the inverter driving will take long time to raise the first output node as a result the second circuit PMOS transistor M3 will be rise fast to turn off the first circuit PMOS transistor M2 to avoid the first output node with load circuit pull to ground voltage. Similarly, the load circuit is added to the second circuit through the second transistor M22 by enable the second selection bit S2 with logic high "1". The operation sequence of adding load circuit with first circuit is similar to second circuit, thus the detailed description of the second circuit operation waveform is omitted herein. It is noted that both the first transistor M11 and second transistor M22 are not enable (i.e., logic high "1") at the same time. Conversely, both transistors are pulled low or disable (i.e., logic low "0") before and after each marking phase to generate the mask bit (stable "1" bit) to generate signature of the PUF device.

Figure 5:
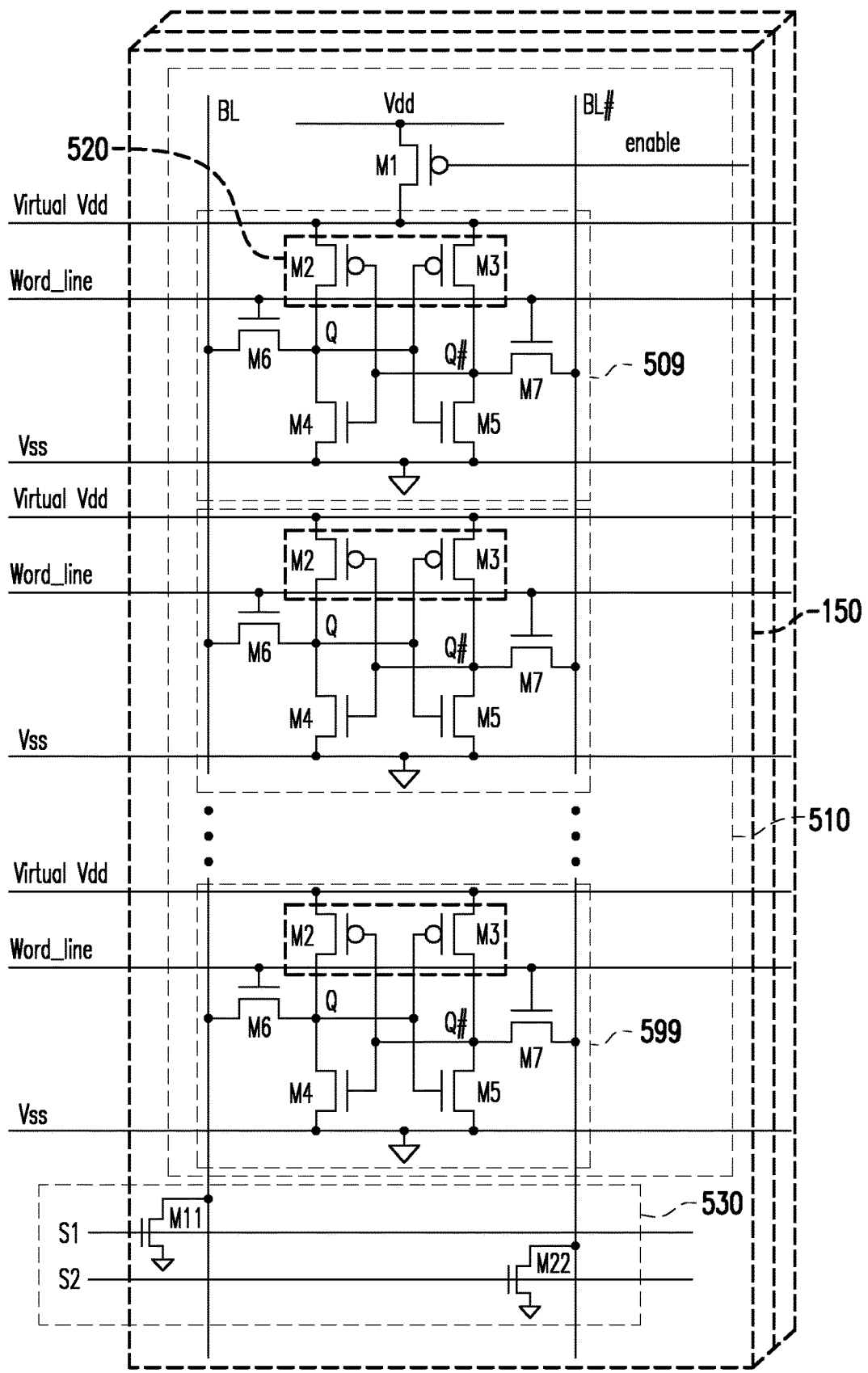
FIG. 5 illustrates a schematic diagram of a PUF device in an array according to an exemplary embodiment of the disclosure.

FIG. 5 illustrates detailed schematic diagram of a PUF device according to an exemplary embodiment of the disclosure. Referring to FIG. 5, a load circuit 530, generates a bias to a PUF cell, and a plurality of PUF cells, each of the plurality of PUF cells includes a sense amplifier 510. The sense amplifier 510 includes a first circuit and a second circuit generates a bit line (BL) and a complementary bit line (BL#). The first circuit having a first pair of transistors M2 and M4 forms an inverter pair, generate an output at BL through sixth transistor M6. The second circuit having a second pair of transistors M3 and M5 forms an inverter pair, generate an output BL# through seventh transistor M7.

The first circuit and second circuit forms a cross coupled inverter. The first circuit and second circuit having CMOS transistors, transistor M2 and M3 is a PMOS coupled to the high side, first predetermined voltage Virtual_VDD and transistors M4 and M5 is a NMOS transistor coupled to the low side, ground voltage (VSS). The plurality of sense amplifier stack in series to reduce the headroom area of the layout by adding plurality of power transistor M1 to each sense amplifier 510 in the PUF cell. The top cell 590 of the sense amplifier 510 in the PUF cell is coupled to the power transistor M1. The cross-coupled pair of the top cell 590 sense amplifier 510 is enable through the power transistor M1. The first terminal and second terminal of the power transistor M1 is coupled to the second predetermined voltage VDD and first predetermined voltage Virtual_VDD of the top cell 590 of the sense amplifier 510. The control terminal of the power transistor is configured to receive enable signal to turn on the power transistor M1 to enable the cross-coupled pair of the top cell 590 of the sense amplifier 510. The bottom cell 599 of the sense amplifier 510 generates an output BL and BL# and latches the output.

Each of the sense amplifier 510 in the PUF cell, the input terminal of the first circuit receives the input from second output node Q# and the input terminal of the second circuit receives the input from the first output node Q. Both the first circuit and second circuit configured to generate the BL and BL# through sixth transistor M6 and seventh transistor M7 respectively. The control terminal of the sixth transistor M6 and seventh transistor M7 are enabled by word_line signal to turn on the transistors to pass the output from the internal output nodes Q and Q# to BL and BL #.

In some embodiment, the load circuit 530 includes a first transistor M11, a second transistor M22, a first capacitor C11 and a second capacitor C22. The load circuit 530 generates a bias voltage Vbias to the sense amplifier 510 to obtain a mask bit (stable "1" bit) to the PUF device. The first terminal of first transistor M11 and second transistor M22 are coupled to the first output node Q and second output node Q# of the sense amplifier 510. The second terminal of the first transistor M11 and the second transistor M22 are coupled to the first terminals of the first capacitor C11 and second capacitor C22. The control terminal of the first transistor M11 and the second transistor M22 receives the first selection bit signal S1 and the second selection bit signal S2 to turn on the first transistor M11 and second transistor M22. The control terminal of the first transistor M11 and the second transistor M22 of the load circuit is selectively turned on by the S1 and S2. It is noted that, both transistors in load circuit is not turned on at the same time. The second terminals of first capacitor C11 and second capacitor C22 are coupled to the ground voltage VSS.

With reference to FIGS. 3A& 3B, FIG. 2, the first selection bit S1 and second selection bit S2 provided with logic low signal "0" bit to turn off both first transistor M11 and second transistor M22 in load circuit at time t0 at the sense amplifier is turned on by enable the enable signal in the power transistor M1. The first circuit receives the bias voltage Vbias through the first transistor M11 by enable the first selection bit S1 with logic high "1" at the time t1. In detail, when the load circuit bias voltage Vbias is added to the first circuit in cross coupled pair there are two possibilities to determine the circuit is stable or unstable. When the first circuit is strong to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit. In some other embodiments the load circuit includes different parasitic elements (e.g., capacitor, resistor, inductor, etc.) to implement the load circuit. Hence the load circuit 530 in this disclosure is not limited thereto.

In another embodiment, the load circuit 530 includes a first transistor M11, and a second transistor M22. The load circuit 530 generates a bias voltage Vbias to the sense amplifier 510 to obtain a mask bit (stable "1" bit) to generate signature of the PUF device. The first terminal of first transistor M11 and second transistor M22 are coupled to the first output node Q and second output node Q# of the sense amplifier 510. The second terminal of the first transistor M11 and the second transistor M22 are coupled to the ground voltage VSS. The control terminal of the first transistor M11 and the second transistor M22 receives the first selection bit signal S1 and the second selection bit signal S2 to turn on the first transistor M11 and second transistor M22. The control terminal of the first transistor M11 and the second transistor M22 of the load circuit 530 selectively turned on by the S1 and S2. It is noted that, both transistors in load circuit 530 is not turned on at the same time.

Referring to FIG. 2, the exemplary embodiment of disclosure, the load circuit 530 is added to the sense amplifier 510 by adding a small current sink as a load circuit to the first circuit or the second circuit to generate a mask bit. In some embodiments the load circuit 530 added to the sense amplifier 510 is smaller than the threshold voltage of the first transistor M11 and the second transistor M22, that is the transistor will operate in linear region to deliver a small current flow through the transistor to the sense amplifier 510, thereby adding bias to the sense amplifier 510.

With reference to FIG. 2 and FIGS. 3A & 3B, in the exemplary embodiment the first selection bit S1 and second selection bit S2 provided with logic low signal "0" bit to turn off both first transistor M11 and second transistor M22 in load circuit at time t0 at the sense amplifier is turned by enable the enable signal in the power transistor M1. The first circuit receives the bias voltage Vbias through the first transistor M11 by enable the first selection bit S1 with logic high "1" at the time t1. After the load bias voltage Vbias is added to the first circuit in cross coupled pair there are two possibilities to determine the circuit is stable or unstable. When the first circuit is strong to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit. The operation sequence of the PUF device 500 is detailed below.

In some embodiments, by adding a load/current/bias to the cross coupled inverter pair in the PUF device, the strong inverter pair to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit. It is noted that the added load circuit will be disabled during normal PUF operation phase. By this method the accuracy of the PUF device will be enhanced by using filtering the stable bit (mask bit) and unstable bit.

Figure 6A:
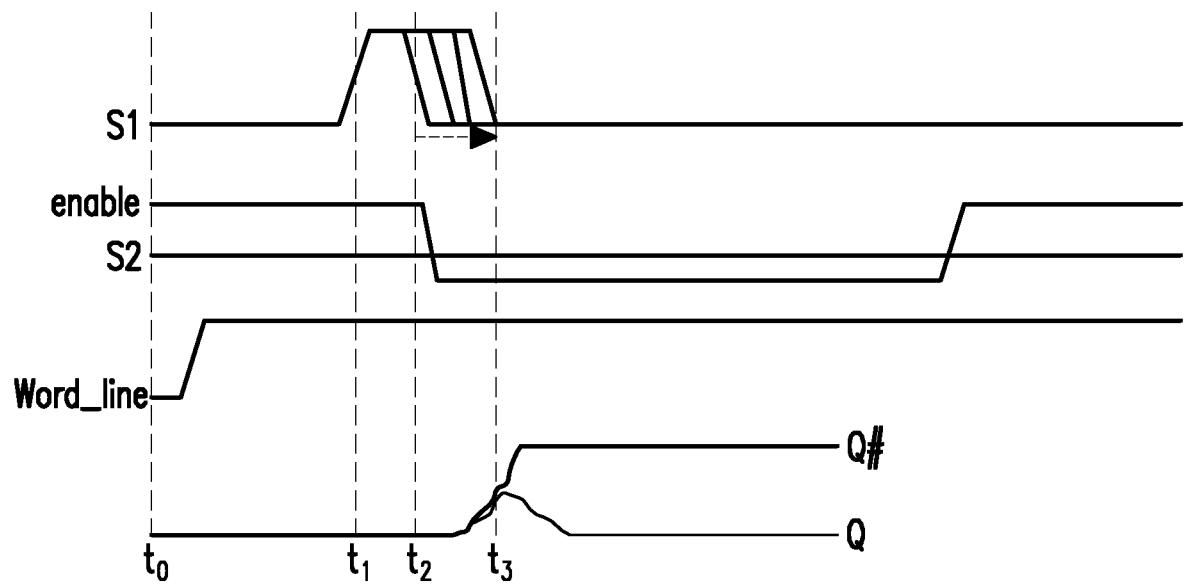
FIG. 6A-6D illustrates an operation waveform of a PUF device in an array according to an exemplary embodiment of the disclosure.
Figure 6B:
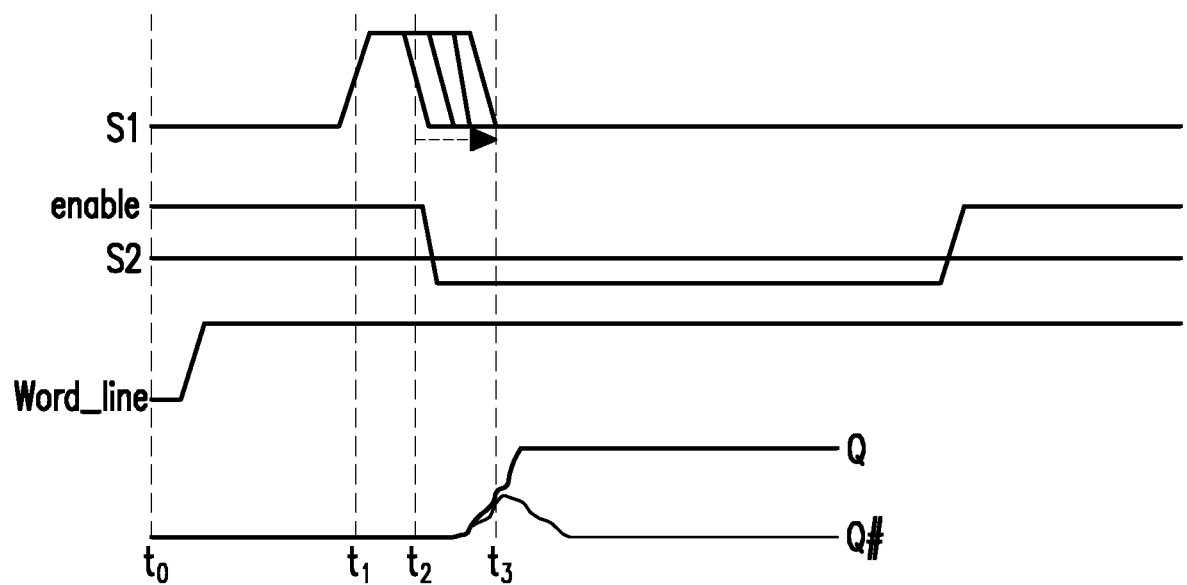
Figure 6C:
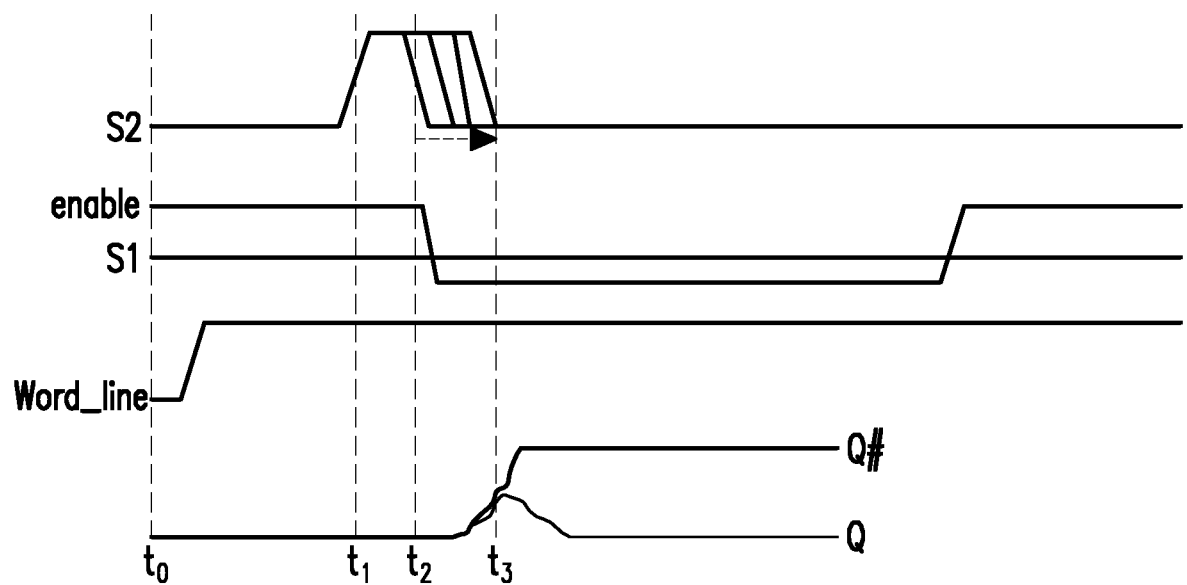
Figure 6D:
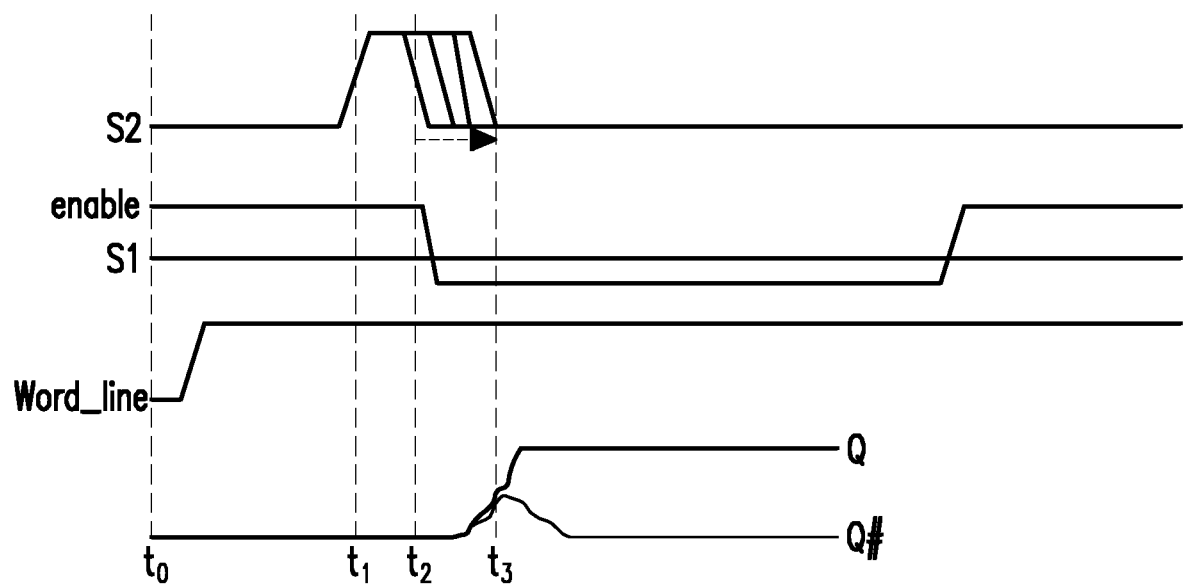

FIGS. 6A&6B illustrates an operation waveform of a PUF device in an array according to another exemplary embodiment of the disclosure. As shown in FIG. 5, the first selection bit S1 and second selection bit S2 provided with logic low signal "0" bit to turn off both first transistor M11 and second transistor M22 in load circuit at time (t0), which is termed as pre-discharge operation. After the pre-discharge, the world line of the sense amplifier 510 is enabled by enable word_line. After the enabling the sense amplifier 510, enable the PUF cells by driving the power transistor M1 with enable signal. The circuit operation of enable load by first selection bit S1 and second selection bit S2 is similar to the circuit operation as illustrated in FIGS. 3A&3B. In detail, the first selection bit S1 and second selection bit S2 provided with logic low signal "0" bit to turn off both first transistor M11 and second transistor M22 in load circuit at time (t0) at the sense amplifier is tuned by enable the enable signal in the power transistor M1. The first circuit receives the small sink current as a load through the first transistor M11 by enable the first selection bit S1 with logic high "1" at the time (0). With reference to FIG. 6A in first case, during time (t2) when the transistor M2 is not enough to overcome the load provided from M11, the second output node Q# may rise faster and turn off the transistor M2 in the inverter causing the first output node pull down to VSS. In other words, current driving capability of M2 is less than M3 by adding an extra load into M2. In contrast, during the time period t2-t3, when the transistor M2 is strong enough to overcome the load provided from M11, the first output node Q may rise faster and turn off the transistor M3 in the inverter causing the second output node pull down to VSS. In detail, the current driving capability of M2 is higher than M3 even the extra load is added at M3. Thus, determining the strong transistor to overcome the extra load during the marking phase to obtain the masking bits. With reference to FIG. 6C-6D, during the second case, when switch S2 is turned on and S1 is turned off, the operation sequence is similar as first case as detailed above in FIG. 6A.

Figure 7:
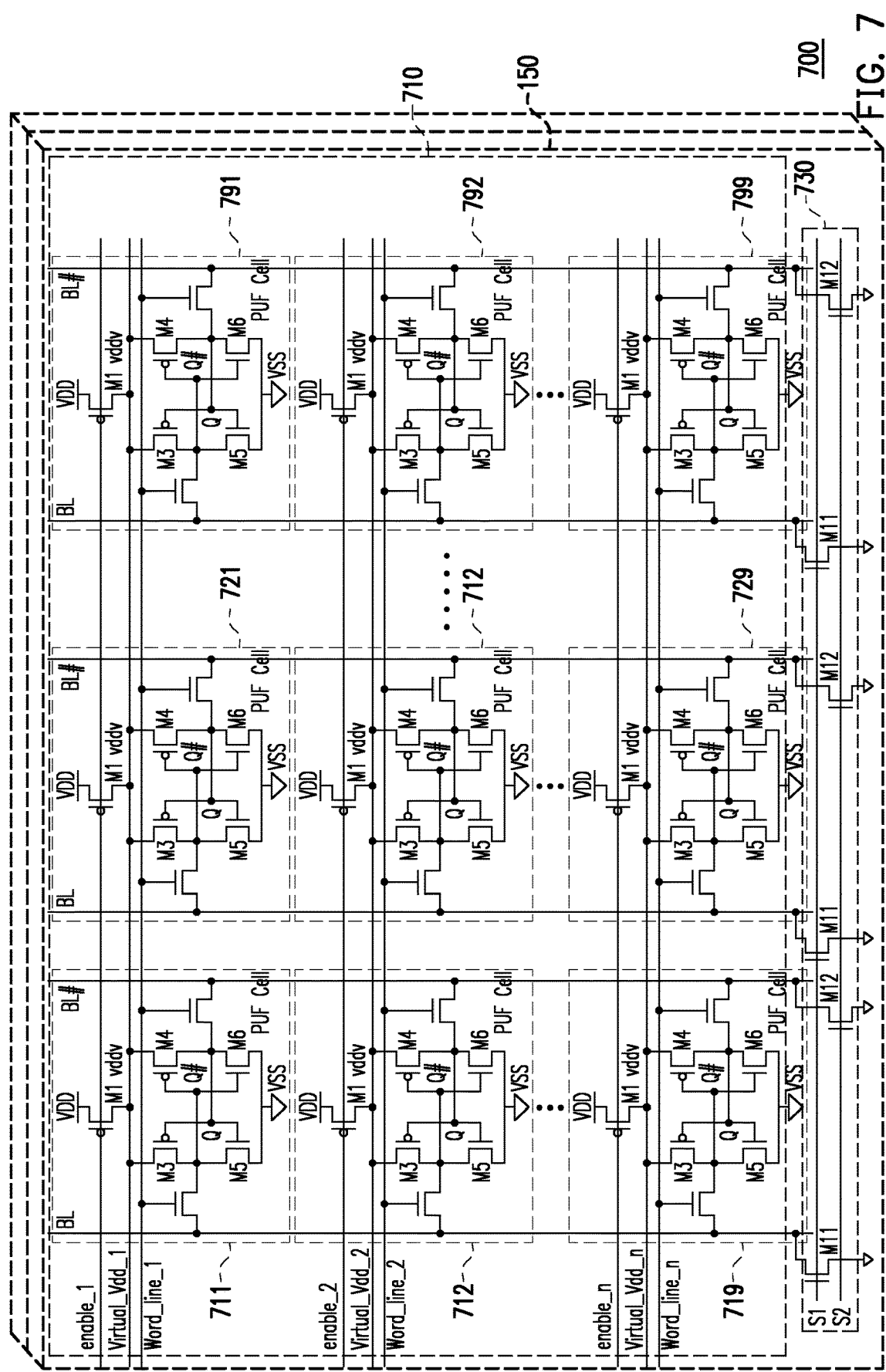
FIG. 7 illustrates a schematic diagram of a PUF device in an array according to an exemplary embodiment of the disclosure.

FIG. 7 illustrates detailed schematic diagram of a PUF device in an array according to an exemplary embodiment of the disclosure. Referring to FIG. 7, a load circuit 730, generates a bias to a PUF cell, and a plurality of PUF cells, each of the plurality of PUF cells includes a sense amplifier 710. The sense amplifier 710 includes a first circuit and a second circuit generates a bit line BL and a complementary bit line BL#. The plurality of PUF cells are stack in matrix to reduce the headroom area of the layout by adding plurality of power transistors M1 to each column in the sense amplifier 710. The sense amplifier 710 have m-columns and n-rows, the PUF cells are arranged in array of m*n matrix. The PUF array of m-columns are similar with the circuit schematic in FIG. 5, in addition to power transistors M1 in each PUF cells in the sense amplifier 710. The top cells 711, 721 . . . 791 of m-columns are coupled to the power transistor M1. The bottom cells 719, 729 . . . 799 of m-columns of the sense amplifier 710 are coupled the load circuit 730. In detail, first row of the PUF device shares the same enable signal enable_1, word line signal word_line_1, and virtual Vdd signal, Virtual_Vdd_1 to enable the first row in a sense amplifier 710 at a same time. Similarly, the second row of the PUF device shares the same enable signal enable_2, word line signal word_line_2, and virtual Vdd signal, Virtual_Vdd_2 to enable the second row in a sense amplifier 710 at a same time. In the same degree of sharing the enable signal, word line signal and virtual Vdd signal for each row in PUF array, nth row of the PUF device shares enable_n, word_line_n, and Virtual_Vdd_n signals to enable nth row of the PUF cell array in the sense amplifier 710. The connection configuration of each column in sense amplifier from 1, 2, . . . $m^{th}$ column is similar to the circuit schematic of FIG. 5 thus, the detail description of the PUF cells in the sense amplifier 710 is omitted herein.

Figure 8A:
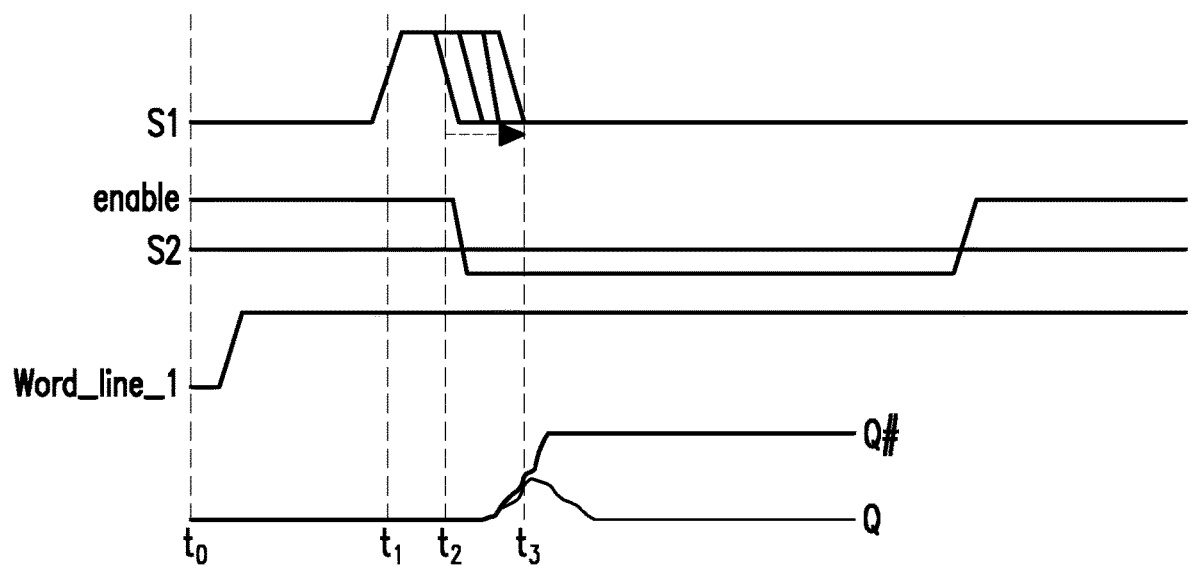
FIG. 8A-8H illustrates an operation waveform of a PUF device in an array according to an exemplary embodiment of the disclosure.
Figure 8B:
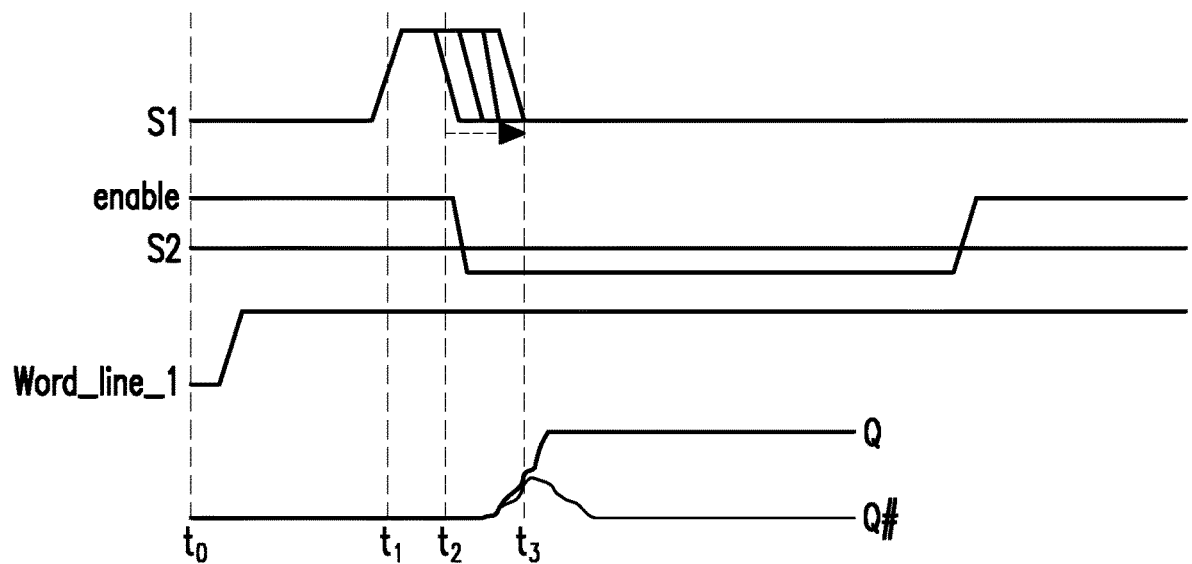
Figure 8C:
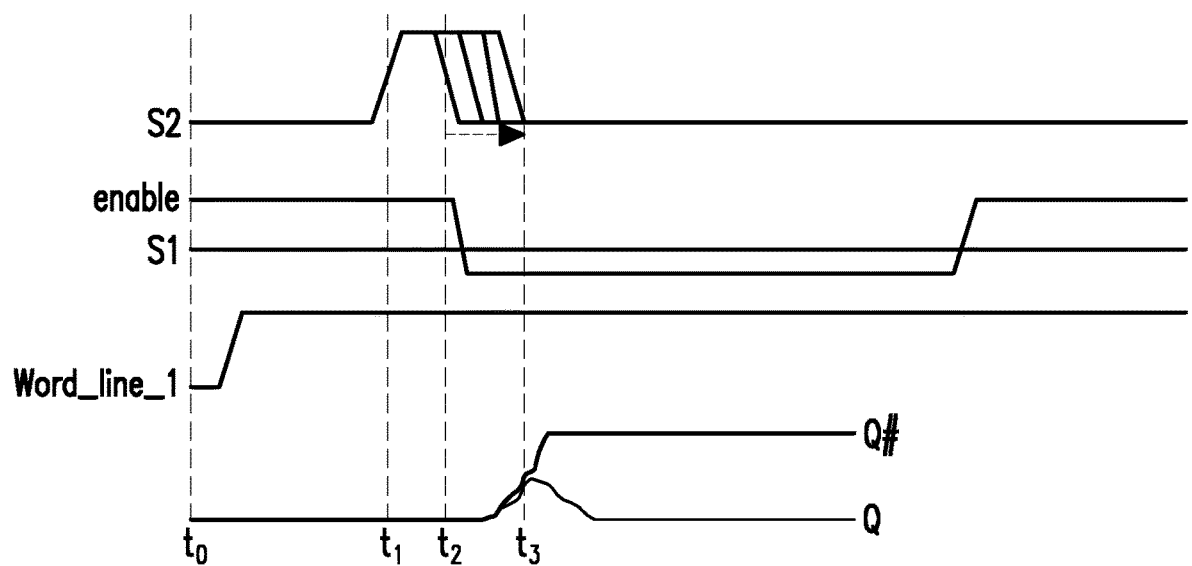
Figure 8D:
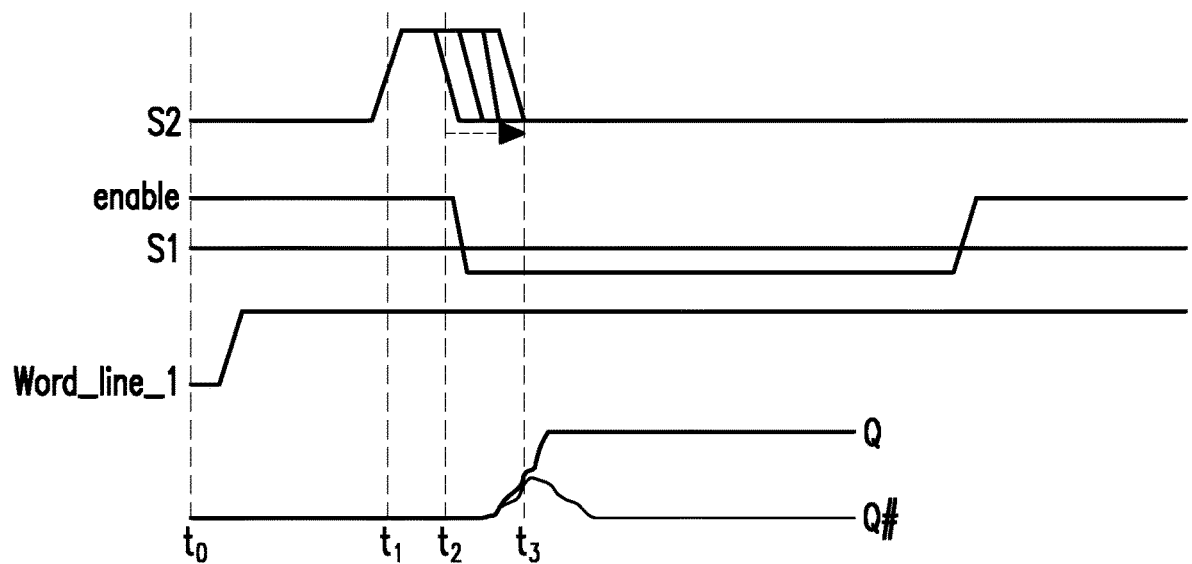
Figure 8E:
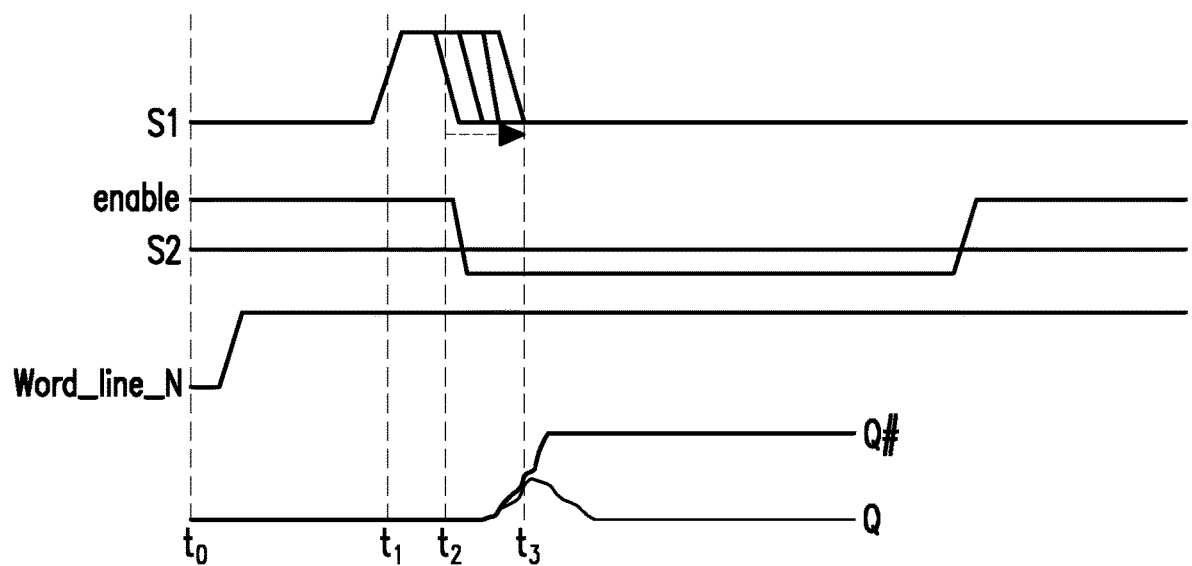
Figure 8F:
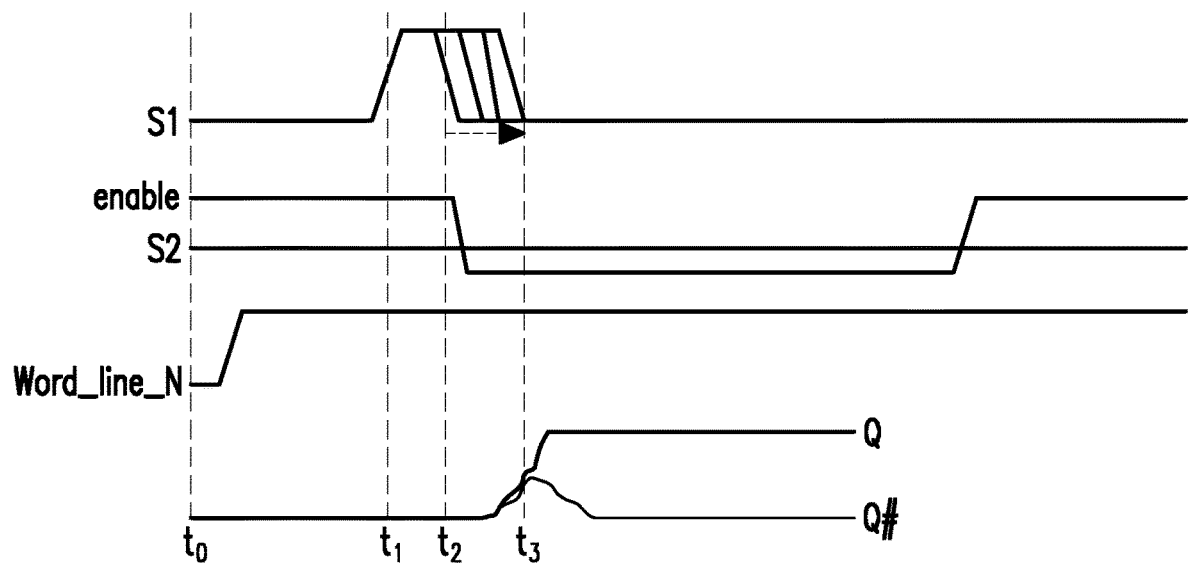
Figure 8G:
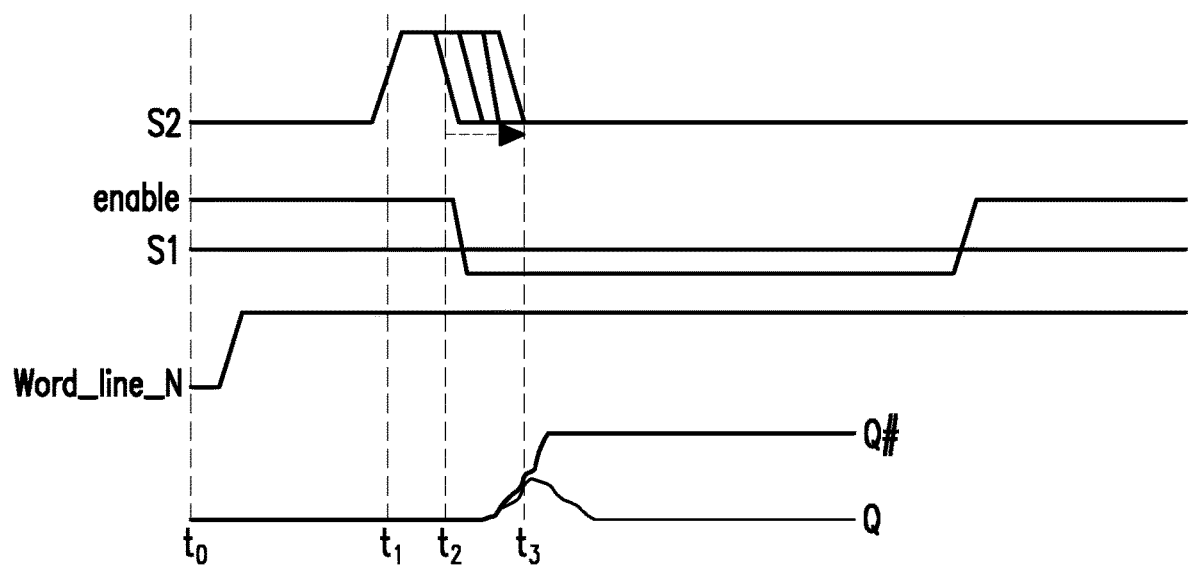
Figure 8H:
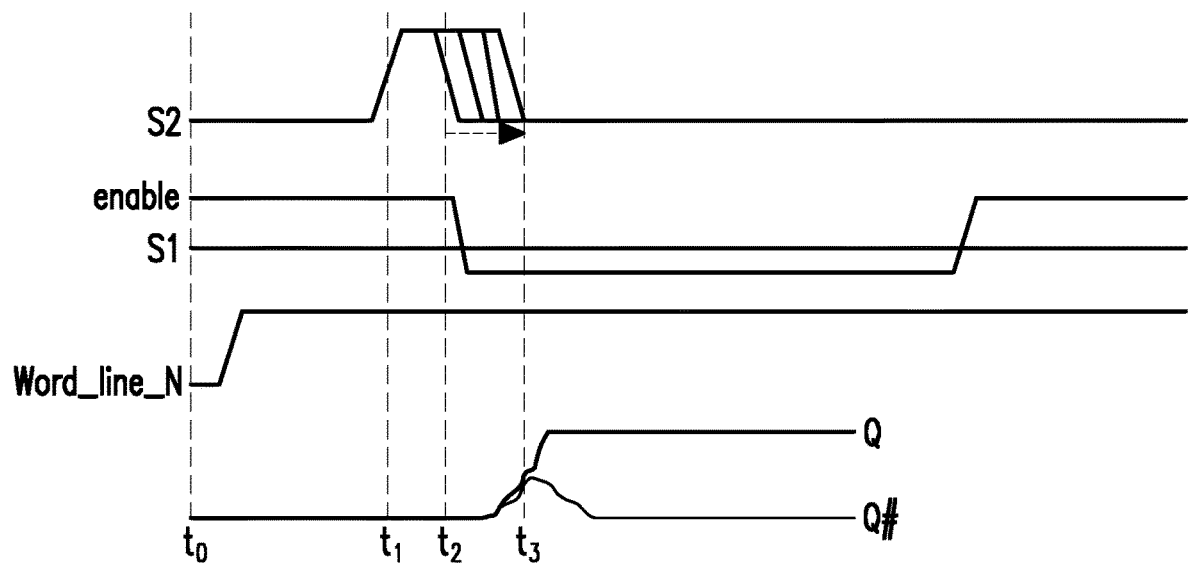

FIG. 8A~8H illustrates an operation waveform of a PUF device in an array according to another exemplary embodiment of the disclosure. As shown in FIG. 5, the first selection bit S1 and second selection bit S2 provided with logic low signal "0" bit to turn off both first transistor M11 and second transistor M22 in load circuit at time (t0), which is termed as pre-discharge operation. After the pre-discharge, the world line of each row in the sense amplifier 710 is enabled by enable word_line, i.e., first row is enabled by word_line_1 which is shown in FIGS. 8A&8D. Each of the rows in the sense amplifier 710 are enabled by enable the word_line signal of the corresponding rows. After the word line of the sense amplifier 710 is enabled, enable the PUF cells by driving the power transistor M1 with enable signal i.e., for example, first row is enabled by enable signal enable_1 which is shown in FIGS. 8A&8D. Similarly, each of the power transistors in rows are enabled by enabling the corresponding enable signal for the particular row. In detail, the first selection bit S1 and second selection bit S2 provided with logic low signal "0" bit to turn off both first transistor M11 and second transistor M22 in load circuit at time (t0) at the sense amplifier is tuned by enable the enable signal in the power transistor M1. In some embodiments the load may be bias voltage add through the capacitor C11 and C22 through the transistor M11 and M22. In some other embodiments the load may be small current sink into the harvester circuit 520 through the transistor M11 and M22. Hence the load in this exemplary embodiment is not limited thereto. The first circuit receives the load through the first transistor M11 by enable the first selection bit S1 with logic high "1" at the time (t1). With reference to FIG. 8A-8B in first case, during time (t2) when the transistor M2 is not enough to overcome the load provided from M11, the second output node Q# may rise faster and turn off the transistor M2 in the inverter causing the first output node pull down to VSS. In other words, current driving capability of M2 is less than M3 by adding an extra load into M2. In contrast, during the time period t2-t3, when the transistor M2 is strong enough to overcome the load provided from M11, the first output node Q may rise faster and turn off the transistor M3 in the inverter causing the second output node pull down to VSS. In detail, the current driving capability of M2 is higher than M3 even the extra load is added at M3. Thus, determining the strong transistor to overcome the extra load during the marking phase to obtain the masking bits. With reference to FIG. 8C-8D, during the second case, when switch S2 is turned on and S1 is turned off, the operation sequence is similar as first case as detailed above in FIG. 3A. In detail, when the load added to the first circuit in cross coupled pair there are two possibilities to determine the circuit is stable or unstable. When the first circuit is strong to overcome the added load circuit, the node will be determined to generate the stable output bit "1" at the first output node (i.e., Q=1), if the first circuit is weak or not strong enough to overcome the added load circuit the internal output node of first circuit Q will flip to "0" to determine the first circuit is unstable to overcome the added load circuit. FIGS. 8E&8H shows the $n^{th}$ row of the sense amplifier 710 is enabled. In detail, the PUF cells in $n^{th}$ row is enabled by enabling power transistor M1 by the enable signal enable_n, world line signal word_line_n and virtual vdd signal Virtual_Vdd_n. Thus, the operation sequence of 8A-8D is similar to the operation sequence of 8E-8H. The circuit operation of enabling load by first selection bit (S1) and second selection bit (S2) is similar to the circuit operation as illustrated in FIGS. 3A&3B.

Accordingly, the disclosure provides a PUF device.

In an aspect, the disclosure is directed to a PUF device which would include not limited to which includes a plurality of PUF cells, configured to generate an output. Each of the plurality of PUF cells having a sense amplifier, includes a first circuit and a second circuit configured to generate a bit line and a complementary bit line. The load circuit, having a first transistor, a second transistor, a first capacitor and a second capacitor configured to generate a bias to the sense amplifier to obtain a mask bit at a first output node and a second output node. The first transistor is coupled to one node of the first capacitor and another node of the first capacitor is coupled to a ground voltage. The second transistor is coupled to one node of the second capacitor and another node of the second capacitor is coupled to a ground voltage. The control terminal of the first transistor is controlled by a first selection bit, and a control terminal of the second transistor is controlled by a second selection bit.

In an aspect, the disclosure is directed to a PUF device which would include not limited to which includes a plurality of PUF cells, configured to generate an output. Each of the plurality of PUF cells having a sense amplifier, includes a first circuit and a second circuit configured to generate a bit line and a complementary bit line. The sense amplifier having a first circuit and a second circuit configured to generate a bit line and a complementary bit line. The first circuit generates an output at a first output node and the second circuit generates an output at the second output node. The load circuit having a first transistor and a second transistor configured to generate a bias to the sense amplifier to obtain a mask bit at a first output node and a second output node. The control terminal of the first transistor is controlled by a first selection bit, and a control terminal of the second transistor is controlled by a second selection bit.

In an aspect, the disclosure is directed to a PUF device which would include not limited to a plurality of sense amplifier, having a first circuit and a second circuit configured to generate a bit line and a complementary bit line. The sense amplifier having a first circuit and a second circuit configured to generate a bit line and a complementary bit line. The first circuit generates an output at a first output node and the second circuit generates an output at the second output node. The load circuit, configured to generate a bias to one of the plurality of sense amplifier to obtain a mask bit at the bit line and the complementary bit line. The harvester circuit, having a first transistor and a second transistor, receives an input from the load and generates the difference in the input.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A physically unclonable function (PUF) device comprising:
   a plurality of PUF cells, generating an output, wherein each of the plurality of PUF cells comprising:
   a sense amplifier, comprising a first circuit and a second circuit coupled to a bit line and a complementary bit line,
   wherein the first circuit generates an output at a first output node and the second circuit generates an output at a second output node;
   a load circuit, comprising a first transistor, a second transistor, a first capacitor and a second capacitor to generate a bias to the sense amplifier to obtain a mask bit at the first output node and the second output node,
   wherein the first transistor is coupled to one node of the first capacitor and another node of the first capacitor is coupled to a ground voltage,
   the second transistor is coupled to one node of the second capacitor and another node of the second capacitor is coupled to a ground voltage,
   a control terminal of the first transistor is controlled by a first selection bit, and a control terminal of the second transistor is controlled by a second selection bit,
   wherein the load circuit generates a bias voltage to the sense amplifier to obtain the mask bit, the first transistor and the second transistor in the load circuit are selectively turned on by the first selection bit or the second selection bit, and the first transistor and the second transistor in the load circuit are not turned on at the same time by the first selection bit and the second selection bit.

2. The PUF device of claim 1, wherein the load circuit further comprises:
   the first transistor, coupled to the sense amplifier at the first output node, and
   the second transistor, coupled to the sense amplifier at the second output node.

3. The PUF device of clair er comprising:
   the first circuit comprising a first pair of transistors to generate an output at the first output node and coupled to the bit line through a third transistor.

4. The PUF device of claim 3, wherein the sense amplifier further comprises:
   the second circuit comprising a second pair of transistors to generate the output at the second output node and coupled to the complementary bit line through a fourth transistor.

5. The PUF device of claim 4, further comprising:
   a control terminal of the first pair of transistors are coupled to the second output node, and
   a control terminal of the second pair of transistors are coupled to the first output node,
   wherein the first pair of transistors and the second pair of transistors forms a cross coupled inverter.

6. The PUF device of claim 1, wherein the sense amplifier further comprises:
   a harvester circuit, comprising a first harvester transistor and a second harvester transistor, receives an input from the load and generates the difference in the input.

7. A physically unclonable function (PUF) device comprising:
   a plurality of PUF cells, generating an output, wherein each of the plurality of PUF cells comprising:
   a sense amplifier, comprising a first circuit and a second circuit coupled to a bit line and a complementary bit line,
   wherein the first circuit generates an output at a first output node and the second circuit generates an output at a second output node;
   a load circuit, comprising a first transistor and a second transistor to generate a bias to the sense amplifier to obtain a mask bit at the first output node and the second output node; and
   a control terminal of the first transistor is controlled by a first selection bit, and a control terminal of the second transistor is controlled by a second selection bit,
   wherein the load circuit generates a bias voltage to one of the first output node and the second output node of the sense amplifier to obtain the mask bit, the first transistor and the second transistor in the load circuit are selectively turned on by the first selection bit or the second selection bit, the first transistor and the second transistor in the load circuit are not turned on at the same time by the first selection bit and the second selection bit.

8. The PUF device of claim 7, wherein the load circuit further comprises:
   the first transistor, coupled to the sense amplifier at the first output node, and
   the second transistor, coupled to the sense amplifier at the second output node.

9. The PUF device of claim 7, further comprising:
   the first circuit comprising a first pair of transistors to generate the output at the first output node and coupled to the bit line through a third transistor.

10. The PUF device of claim 7, wherein the sense amplifier further comprises:
    the second circuit comprising a plurality of transistors to generate output at the second output node and coupled to the complementary bit line through a fourth transistor.

11. The PUF device of claim 10, further comprising:
    a control terminal of the first pair of transistors are coupled to the second output node, and
    a control terminal of the second pair of transistors are coupled to the first output node,
    wherein the first pair of transistors and the second pair of transistors forms a cross coupled inverter.

12. The PUF device of claim 7, further comprising:
a harvester circuit, comprising a first harvester transistor and a second harvester transistor, receives an input from the load and generates the difference in the input.

13. The PUF device of claim 7, wherein the first transistor or the second transistor of the load circuit is operated in linear region.

14. A physically unclonable function (PUF) device comprising:
a plurality of sense amplifiers, comprising a first circuit and a second circuit coupled to a bit line and a complementary bit line;
a load circuit, generating a bias to the plurality of sense amplifiers to obtain a mask bit at the bit line and the complementary bit line,
a plurality of harvester circuit, respectively comprising a first harvester transistor and a second harvester transistor, receives an input from the load and generates the difference in the input,
wherein the load circuit generates a bias voltage to one of the bit line and the complementary bit line to obtain the mask bit, a first transistor and a second transistor in the load circuit are selectively turned on by the first selection bit or the second selection bit, the first transistor and the second transistor in the load circuit are not turned on at the same time by the first selection bit and the second selection bit.

15. The PUF device of claim 14, wherein the load circuit comprises:
a first transistor, a second transistor, a first capacitor and a second capacitor,
wherein the first transistor is coupled to one node of the first capacitor and another node of the first capacitor is coupled to a ground voltage,
the second transistor is coupled to one node of the second capacitor and another node of the second capacitor is coupled to a ground voltage.

16. The PUF device of claim 14, wherein the load circuit further comprises:
a first transistor and a second transistor to generate the bias to the sense amplifiers to obtain the mask bit at the bit line and the complementary bit line.

17. The PUF device of claim 14, wherein the first transistor or the second transistor of the load circuit is operated in linear region.

18. The PUF device of claim 14, wherein the sense amplifiers further comprise:
the first circuit comprising a plurality of first pairs of transistors to generate outputs at a plurality of first output nodes and coupled to the bit line through a plurality of third transistors sixth transistor, and
the second circuit comprising a plurality of second pairs of transistors to generate outputs at a plurality of second output nodes and coupled to the complementary bit line through a plurality of fourth transistors.

19. The PUF device of claim 18, further comprising:
a control terminal of each first pair of transistors is coupled to the second output node,
a control terminal of each second pair of transistors is coupled to the first output node,
wherein one of the first pairs of transistors and a corresponding one of the second pairs of transistors form a cross coupled inverter.

20. The PUF device of claim 18, wherein an inverter formed by one of the first pairs of transistors is cross coupled to another inverter formed by formed by another one of the second pairs of transistors.

* * * * *